UNITED STATES PATENT OFFICE 2,438,612

COPOLYMERS OF TETRAALLYLSILANE

Charles A. MacKenzie, Upper Montclair, and John B. Rust, Montclair, N. J., assignors, by direct and mesne assignments, of one-half to Montclair Research Corporation, a corporation of New Jersey, and one-half to Ellis-Foster Company, a corporation of New Jersey No Drawing. Application September 26, 1944, Serial No. 555,901

8 Claims. (Cl. 260—84)

The present invention relates to insoluble, infusible addition polymers and to the process of making the same. It is an object of this invention to produce insoluble and infusible or insoluble and very high melting addition polymers. It is a further object of this invention to produce additional polymers which have substantially no cold flow. It is also an object of this invention to produce cast plastics from addition polymers which are free from flaws, air bubbles and the like.

Other objects and advantages will become apparent from the more detailed description and explanation given hereinafter. It is understood that this more detailed description and explanation is given by way of illustration only and should not be considered as limiting, since a number of variations may be made by those skilled in the art without departing from the spirit and scope of the invention.

Tetraallylsilane is a colorless liquid boiling at 77° C. at 3 mm. It is an unsaturated silicon compound containing no hydrolyzable atomic linkages and thus does not undergo hydrolysis. Although it contains a plurality of unsaturated radicals it does not polymerize to a solid when heated with a peroxide catalyst for a long time. However, it has been found that, when mixed with liquids capable by themselves of undergoing addition polymerization to form thermoplastics, tetraallylsilane polymerized therewith to form solid copolymers which are insoluble and infusible even when the silane is present in very small amounts in the copolymerizatizing mixture. Other unsaturated silicon compounds of the same type also undergo copolymerization when heated with a compound capable of addition polymerization.

The process of the present invention comprises copolymerizing mixtures of carbon compounds which are capable of addition polymerization and which contain a single

group, such as styrene and styrene derivatives, esters of methacrylic acid, esters of acrylic acid, vinyl esters and vinyl halides, with an unsaturated silicon compound which is incapable of hydrolysis, the latter compound comprising up to about 40% of the mixture. We are aware that it has been proposed to copolymerize substances, which are capable of undergoing additive polymerization, with allyl esters of silicic acid. However, these esters contain Si—O—C linkages and readily undergo hydrolysis to form silica. Thus plastics, lacquers, castings and so forth, made from these materials would have a tendency to deteriorate, at least on the surface, over a period of time in a moist atmosphere. In the process of the present invention, a non-hydrolyzable, unsaturated silicon derivative is copolymerized with those substances which are capable of undergoing addition polymerization. Such silicon derivatives include allylsilanes and allyl silicon oxides and hydroxides containing at least two allyl groups per silicon atom and no Si—O—C linkages such as tetraallylsilane, tetramethallylsilane, tetracrotylsilane, hexaallyl silicon oxide, low polymers of diallyl silicon hydroxide and allyl silicon trihydroxide, diallyl diethylsilane, triallyl silicon hydroxide, dicrotyl diphenyl silane, hexamethaethylallyl silicon oxide, and the like.

It is known that thermoplastic materials derived from the polymerization of styrene, methyl methacrylate, vinyl acetate, ethyl methacrylate, and the like, may be easily molded. These moldings, however, especially when subjected to slightly elevated temperatures or small stresses over a length of time, tend to deform permanently. This phenomenon is called "cold flow." By subjecting the addition-polymerizable compounds to copolymerization with an unsaturated, non-hydrolyzable silicon compound which possesses at least two functional groups, cross-linking of the macropolymer chains occurs, with decrease in solubility of the polymer and increase in the resistance to cold flow. Such copolymers possess added strength and when an unsaturated silicon derivative containing oxygen is used, much greater heat resistance is obtained in the copolymerized plastic. Thus by using the unsaturated silicon derivatives of the present invention we may secure copolymers which tend to resist decomposition, yellowing and so forth at higher temperatures and which are insoluble or only slightly soluble in a number of organic solvents and furthermore which have a reduced tendency toward cold flow.

The mixture of unsaturated silicon compound and addition-polymerizable liquid may be copolymerized in the presence of other substances such as resins and plasticizers. For example, polymerized styrene, acrylic or methacrylic esters, vinyl esters, etc., may be added to the mixture resulting in a final polymer of greater thermal rigidity and solvent resistance than possessed by the polymeric materials which are introduced.

The silicon derivatives of the present invention may be made by the interaction of a Grignard reagent with silicon tetrahalide according to the usual methods of preparing silicon derivatives. They also may be made by a one-step process wherein a mixture of alkyl halide and silicon tetrahalide is treated with magnesium at an elevated temperature. We have found that such a one-step process is eminently satisfactory for making the unsaturated silicon derivatives of the present invention, since when an attempt is made to make a Grignard reagent, using an unsaturated alkyl halide, side reactions set in and very poor yields are obtained.

The following are examples which illustrate the process of the present invention and the products obtainable therefrom.

*Example 1.—Preparation of tetraallylsilane*

Four hundred grams of ethyl ether was placed in a 3-necked, stirrer-equipped flask, with 30 g. of magnesium turnings (2.5 moles). A Grignard reaction was started in a test tube with 1 ml. of methyl iodide. This product was added to the reaction flask. A mixture of 76 g. allyl chloride (1 mole) and 34 g. silicon tetrachloride (.2 mole) dissolved in 100 ml. of ethyl ether, was added slowly over a 3 hour period to the stirred mixture. A large amount of solid formed and the mixture refluxed moderately. The mixture was next poured on cracked ice and the ether layer separated and dried over CaCl₂. The ether was removed by distillation through a 4-bulb pear column. The major portion of the residue distilled at 77° C. at 3 mm. A sample of the product was distilled at 755 mm. It boiled with considerable decomposition at approximately 205° C.

|  | Per cent |
|---|---|
| Silicon, calculated for Si (CH₂CH=CH₂)₄ | 14.6 |
| Silicon, found | 14.4 |

*Example 2.—Vinyl acetate-tetraallylsilane polymers*

Mixtures of vinyl acetate and tetraallylsilane were prepared with the silane comprising the following proportions by weight: 20%, 15%, 1.0%, 0.0%. One per cent of benzoyl peroxide was added in each case. The samples were heated at 70° C. until gelation occurred. The silane caused slight inhibition of the polymerization, the difference being particularly noticeable with the samples containing the higher portions of silane. The temperature was raised, during a one hour period, to 100° C. and kept at this point for 3 hours. The samples were then cooled and placed in acetone. The vinyl acetone product containing no silane went into solution whereas the ether products swelled but remained insoluble in the solvent. Likewise, when heated on a hot plate, the vinyl acetate product containing no silane fused to a viscous mass while the others remained solid.

*Example 3.—Methyl methacrylate-tetraallylsilane polymers*

Mixtures of methyl methacrylate and tetraallylsilane were prepared with the silane comprising the following proportions by weight: 20%, 5%, 1.0%, 0.0%. One per cent of benzoyl peroxide was added in each case. The samples were heated at 75° C. for 4 hours. The products were cooled and placed in acetone overnight. The sample containing no silane dissolved in acetone whereas the other products swelled but remained insoluble in the solvent.

*Example 4.—Butyl methacrylate-tetraallylsilane polymers*

Mixtures of butyl methacrylate and tetraallylsilane were prepared with the silane compris-ing the following proportions by weight: 20%, 1%, 0.0%. One per cent of benzoyl peroxide was added in each case. The mixtures were heated for 18 hours at 100° C. They were then cooled and the solids obtained were placed in acetone. The sample containing no silane dissolved in acetone whereas the other products swelled but remained insoluble in the solvent.

We claim:

1. A composition comprising the product of copolymerization of a mass comprising tetraallylsilane and an addition polymerizable carbon compound containing a single

group selected from the class consisting of methyl methacrylate, butyl methacrylate and vinyl acetate, the silane constituting from 1 to 20% by weight of the copolymer.

2. The process of making an insoluble-infusible copolymer which comprises heating a mixture containing tetraallylsilane and an addition polymerizable carbon compound containing a single

group selected from the class consisting of methyl methacrylate, butyl methacrylate and vinyl acetate, the silane constituting from 1 to 20% by weight of the mixture.

3. The process of making an insoluble-infusible copolymer which comprises heating a mixture consisting of tetraallylsilane and methyl methacrylate the silane constituting from 1 to 20% by weight of the mixture, and benzoyl peroxide as catalyst.

4. The process of making an insoluble-infusible copolymer which comprises heating a mixture consisting of tetraallylsilane and butyl methacrylate the silane constituting from 1 to 20% by weight of the mixture, and benzoyl peroxide as catalyst.

5. The process of making an insoluble-infusible copolymer which comprises heating a mixture consisting of tetraallylsilane and vinyl acetate the silane constituting from 1 to 20% by weight of the mixture, and benzoyl peroxide as catalyst.

6. The insoluble and infusible copolymer of tetraallylsilane and methyl methacrylate, the silane constituting from 1 to 20% by weight of the copolymer.

7. The insoluble and infusible copolymer of tetraallylsilane and butyl methacrylate, the silane constituting from 1 to 20% by weight of the copolymer.

8. The insoluble and infusible copolymer of tetraallylsilane and vinyl acetate, the silane constituting from 1 to 20% by weight of the copolymer.

CHARLES A. MacKENZIE.
JOHN B. RUST.

REFERENCES CITED

The following references are of record in the file of this patent:

UNITED STATES PATENTS

| Number | Name | Date |
|---|---|---|
| 2,276,094 | Rothrock | Mar. 10, 1942 |
| 2,371,050 | Hyde | Mar. 6, 1945 |
| 2,377,689 | Hyde | June 5, 1945 |
| 2,388,161 | Kropa | Oct. 30, 1945 |